(12) United States Patent
Raux et al.

(10) Patent No.: US 10,140,977 B1
(45) Date of Patent: Nov. 27, 2018

(54) GENERATING ADDITIONAL TRAINING DATA FOR A NATURAL LANGUAGE UNDERSTANDING ENGINE

(71) Applicant: botbotbotbot Inc., Menlo Park, CA (US)

(72) Inventors: Antoine Raux, Palo Alto, CA (US); Yi Ma, Palo Alto, CA (US)

(73) Assignee: botbotbotbot Inc., Palo Alto, CA (US)

( * ) Notice: Subject to any disclaimer, the term of this patent is extended or adjusted under 35 U.S.C. 154(b) by 0 days.

(21) Appl. No.: 16/051,362

(22) Filed: Jul. 31, 2018

(51) Int. Cl.
*G06F 17/27* (2006.01)
*G10L 15/06* (2013.01)
*G06K 9/62* (2006.01)
*G06F 15/18* (2006.01)
*G06N 3/02* (2006.01)
*G10L 15/01* (2013.01)
*G10L 15/22* (2006.01)

(52) U.S. Cl.
CPC .......... *G10L 15/063* (2013.01); *G06F 15/18* (2013.01); *G06F 17/27* (2013.01); *G06K 9/6256* (2013.01); *G06N 3/02* (2013.01); *G10L 15/01* (2013.01); *G10L 15/22* (2013.01); *G10L 2015/225* (2013.01)

(58) Field of Classification Search
USPC ........................ 704/1–10, 230–257, 270–277
See application file for complete search history.

(56) References Cited

U.S. PATENT DOCUMENTS

| 8,990,126 B1 * | 3/2015 | Bangalore ............. G06F 17/211 706/12 |
| 2007/0244702 A1 * | 10/2007 | Kahn ...................... G10L 15/22 704/260 |
| 2009/0063150 A1 * | 3/2009 | Nasukawa ............. G10L 15/26 704/253 |

OTHER PUBLICATIONS

Dinarelli, et al., "Effective Spoken Language Labeling with Deep Recurrent Neural Networks", https://arxiv.org/pdf/1706.06896.pdf, Jun. 20, 2017.

Matteo Pagliardini, et al., "Unsupervised Learning of Sentence Embeddings using Compositional n-Gram Features", https://arxiv.org/pdf/1703.02507.pdf, Jul. 10, 2017.

(Continued)

*Primary Examiner* — Huyen Vo
(74) *Attorney, Agent, or Firm* — Fish & Richardson P.C.

(57) ABSTRACT

Methods, systems, and apparatus, including computer programs encoded on computer storage media, for generating additional training data for a natural language understanding engine. One of the methods includes: obtaining data identifying (i) a first input conversational turn and (ii) a first annotation, determining that the first annotation accurately characterized the first input conversational turn, determining that the natural language understanding engine is likely to generate inaccurate annotations of other conversational turns that are similar to the first input conversational turn, in response to the determining, obtaining one or more first paraphrases of the first input conversational turn; and generating, for each of the one or more first paraphrases, a respective first training example that identifies the first (Continued)

annotation as the correct annotation for the first paraphrase; and training the natural language understanding engine on at least the first training examples.

30 Claims, 4 Drawing Sheets

(56) References Cited

OTHER PUBLICATIONS

Lina M. Rojas-Barahona, et al., "Exploiting Sentence and Context Representations in Deep Neural Models for Spoken Language Understanding", http://mi.eng.cam.ac.uk/~sjy/papers/rgms16.pdf, Proceedings of COLING 2016, the 26th International Conference on Computational Linguistics: Technical Papers, pp. 258-267, Dec. 2016.

Dilek Hakkani-Tur, et al., "Multi-Domain Joint Semantic Frame Parsing using Bi-directional RNN-LSTM", https://pdfs.semanticscholar.org/d644/ae996755c803e067899bdd5ea52498d7091d.pdf, Proceedings of the 17th Annual Meeting of the International Speech Communication Association (INTERSPEECH 2016), Jun. 24, 2016.

Yao, et al., "Spoken Language Understanding Using Long Short-Term Memory Neural Networks", https://groups.csail.mit.edu/sls/publications/2014/Zhang_SLT_2014.pdf, IEEE Spoken Language Technology Workshop (SLT), Dec. 2014.

Stefan Hosein, "Active Learning: Curious AI Algorithms", https://www.datacamp.com/community/tutorials/active-learning, Feb. 9, 2018.

"Stream-based active learning for data selection in a real world application C0603", https://pdfs.semanticscholar.org/171e/e9944e1dd9d387963b570424e577c5f2c75f.pdf, 2004.

Toyoura et al., "A machine learning-based selective sampling procedure for identifying the low energy region in a potential energy surface: a case study on proton conduction in oxides", https://arxiv.org/pdf/1512.00623.pdf, Dec. 4, 2015.

\* cited by examiner

GENERATING ADDITIONAL TRAINING DATA FOR A NATURAL LANGUAGE UNDERSTANDING ENGINE

BACKGROUND

This specification relates to dialogue systems.

A dialogue system is a computer system that has conversations with users by generating system outputs in response to user conversational turns.

For example, during a given conversation, a dialogue system can receive a speech input from the user that represents a conversational turn, convert the speech input to text, and then operate on the text to generate a speech output that is a response to the speech input received from the user.

Dialogue systems can be used to converse with users to accomplish any of a variety of tasks. For example, a dialogue system can be used to allow users to select options from a menu, e.g., food items from a restaurant menu. As another example, a dialogue system can be used to allow users to make a reservation, e.g., a restaurant reservation or a travel reservation.

Some dialogue systems use neural networks as part of generating a system output from a user input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a dialogue system implemented as computer programs on one or more computers in one or more locations can generate additional training data that improves the performance of a natural language understanding (NLU) engine that is included in the dialogue system.

In general, one innovative aspect of the subject matter described in this specification can be embodied in methods that include the actions of obtaining, during operation of a computer-implemented dialogue system comprising a natural language understanding engine, data identifying (i) a first input conversational turn that was provided as input to the natural language understanding engine during a dialogue between a user and the computer-implemented dialogue system and (ii) a first annotation of the first input conversational turn generated by the natural language understanding engine, wherein the natural language understanding engine has been trained on a first set of training data comprising a plurality of training conversational turns; determining that the first annotation accurately characterized the first input conversational turn; determining, based on the training conversational turns in the first set of training data, that the natural language understanding engine is likely to generate inaccurate annotations of other conversational turns that are similar to the first input conversational turn; in response to determining that (i) the first annotation accurately characterized the first input conversational turn but (ii) the natural language understanding engine is likely to generate inaccurate annotations of other conversational turns that are similar to the first input conversational turn: obtaining one or more first paraphrases of the first input conversational turn; and generating, for each of the one or more first paraphrases, a respective first training example that identifies the first annotation as the correct annotation for the first paraphrase; and training the natural language understanding engine on at least the first training examples.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

Determining, based on the training conversational turns in the first set of training data, that the natural language understanding engine is likely to generate inaccurate annotations of other conversational turns that are similar to the first input conversational turn can include: identifying training conversational turns in the training data that are similar to the first input conversational turn according to a similarity measure.

Identifying training conversational turns in the training data that are similar to the first input conversational turn according to a similarity measure can include: determining a numeric embedding representation of the first input conversational turn; determining respective numeric embedding representations of each of the training conversational turns; and determining respective distances between the numeric embedding representation of the first input conversational turn and the numeric embedding representations of the training conversational turns.

Determining, based on the training conversational turns in the first set of training data, that the natural language understanding engine is likely to generate inaccurate annotations of other conversational turns that are similar to the first input conversational turn can comprise: determining that there are less than a threshold number of training conversational turns that are similar to the first input conversational turn according to the similarity measure.

Determining, based on the training conversational turns in the first set of training data, that the natural language understanding engine is likely to generate inaccurate annotations of other conversational turns that are similar to the first input conversational turn can comprise: determining that the natural language understanding unit performs poorly on training conversational turns that are similar to the first input conversational turn according to the similarity measure.

The actions can further comprise obtaining a confidence score generated by the natural language understanding engine that represents a confidence that the first annotation is an accurate characterization of the first input conversational turn and determining that the first annotation accurately characterized the first input conversational turn can comprise determining that the confidence score exceeds a threshold score.

Determining that the first annotation accurately characterized the first input conversational turn can comprise: processing the first input conversational turn and the first annotation using a post-hoc annotation machine learning model that is configured to generate as output a quality score that represents a likelihood that the first annotation is an accurate characterization of the first input conversational turn; and determining that the quality score exceeds a threshold score.

The post-hoc annotation machine learning model can be configured to receive as input (i) the first input conversational turn, (ii) the first annotation, (iii) one or more conversational turns occurring before the first input conversational turn in the dialogue, and (iv) one or more conversational turns occurring after the first input conversational turn in the dialogue.

Determining that the first annotation accurately characterized the first input conversational turn can comprise: determining that conversational turns occurring after the first input conversational turn in the dialogue indicate that the first annotation accurately characterizes the first input conversational turn.

Determining that conversational turns occurring after the first input conversational turn in the dialogue indicate that the first annotation accurately characterize the first input conversational turn can comprise: determining (i) that a task was completed as a result of the dialogue and (ii) that no slot values assigned in the first annotation were changed or removed by the user in any of the conversational turns occurring after the first input conversational turn in the dialogue.

The actions can further comprise obtaining, during operation of the computer-implemented dialogue system, data identifying (i) a second input conversational turn that was provided as input to the natural language understanding engine during the dialogue between the user and the computer-implemented dialogue system and (ii) a second annotation of the second input conversational turn generated by the natural language understanding engine; determining that the second annotation did not accurately characterize the second input conversational turn; in response to determining that the second annotation did not accurately characterize the second input conversational turn: determining a correct annotation for the second conversational turn; obtaining one or more second paraphrases of the second input conversational turn; and generating, for each of the one or more second paraphrases, a respective second training example that identifies the correct annotation for the second conversational turn as the correct annotation for the second paraphrase; and training the natural language understanding engine on at least the second training examples.

The subject matter described in this specification can be implemented in particular embodiments so as to realize one or more of the following advantages.

The described systems can generate training data that is used to improve the performance of the NLU engine and, therefore, the performance of a computer-implemented dialogue system that includes the NLU engine. That is, by generating additional training data as described in this specification and training the NLU engine on the generated additional training data, the computer-implemented dialogue system is able to achieve increased performance on a variety of tasks, i.e., is better able to interact with users to assist the users in completing a variety of tasks, because the NLU engine generates more accurate annotations of received user inputs.

More specifically, the system can generate the additional training data in a manner that results in high quality training data being generated but minimizes the amount of human interaction, time, and computational resources, e.g., memory and processing power, required to generate the data.

In particular, generating training data for an NLU engine requires accurate annotations to be obtained for the conversational turns in the training data. That is, the conversational turns in the training data must be labelled with accurate annotations in order for the training data to be useful in improving the performance of the NLU engine.

Obtaining such accurate annotations is conventionally a time-intensive process that requires input from expert human labelers, e.g., because generating an accurate annotation requires accurately identifying a task-specific intent for the conversational turn as well as accurately identifying the intent-specific slots for the identified intent.

The described techniques, on the other hand, reduce the amount of time, human involvement, and computational resources necessary for generating high-quality training data. In particular, the described techniques effectively generate additional training data using paraphrases of a given identified conversational turn. This allows the paraphrases to be associated with the same correct annotation as the identified conversational turn, resulting in a large number of high-quality additional training data being generated without needing to expend computational resources or time to obtain new correct annotations for the paraphrases.

Additionally, the additional data is generated to specifically target areas where the NLU, as currently trained, performs poorly. By generating high-quality training data that targets these areas as described in this specification, the total amount of training data required to train the NLU (and, therefore, the computer-implemented dialogue system) to have a high performance quality is reduced, thereby reducing the amount of time and computational resources consumed by the training process. In other words, using the described techniques, the system avoids re-training the NLU on areas where the NLU already performs well, reducing the amount of time and computational resources consumed by the training process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
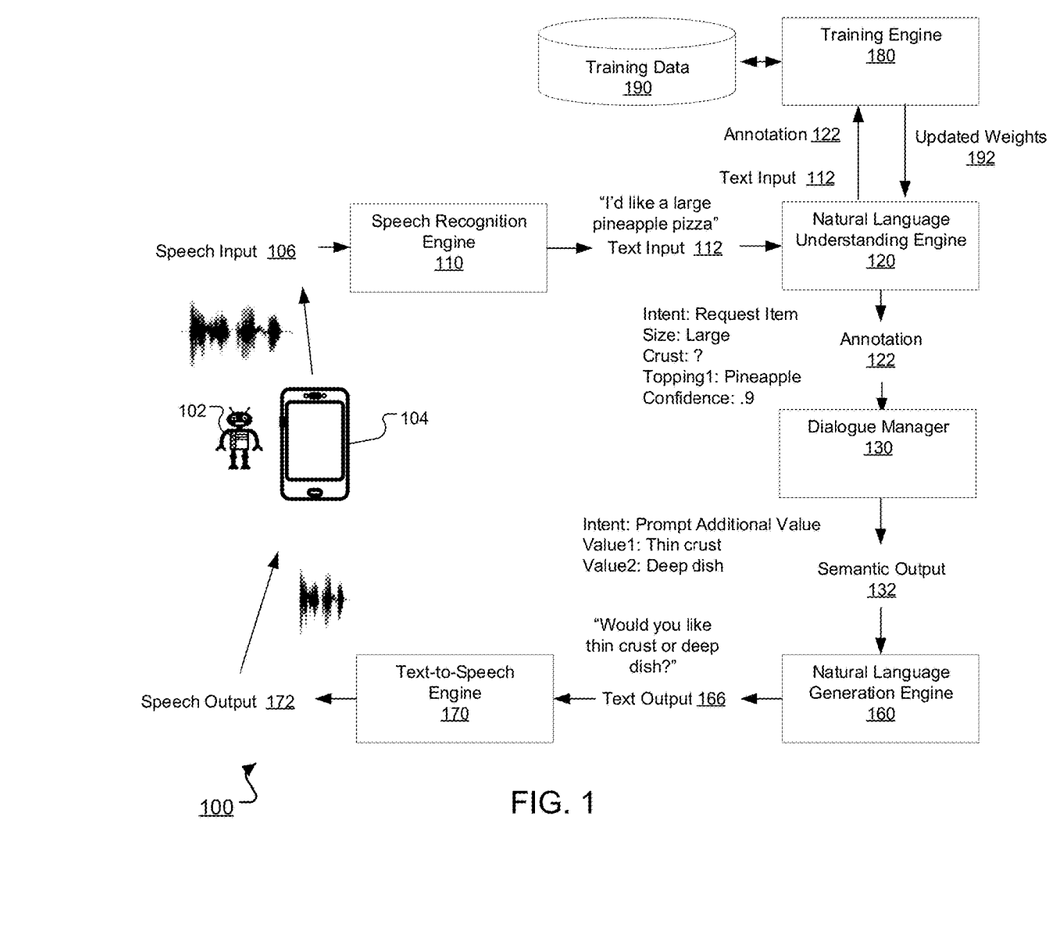
FIG. 1 shows an example dialogue system.

FIG. 1 shows an example dialogue system 100. The dialogue system 100 is an example of a system implemented as computer programs on one or more computers in one or more locations, in which the systems, components, and techniques described below are implemented.

The dialogue system 100 is a system that engages in conversations with users of the system.

Generally, each conversation is an attempt by the dialogue system 100 to interact with a user to complete a task for the user. Examples of tasks can include a food delivery task, a shopping task, a restaurant reservation task, a travel reservation task, or a route planning navigation task, among many others.

In some cases, the task is determined before the conversation begins. For example, the dialogue system 100 may only be configured to perform a single task. As another example, the task to be completed by a given conversation may be defined by the interface through which the user inputs are received during the conversation. That is, each of multiple tasks that the system is configured to complete is initiated by a user input submitted through a corresponding interface.

In other cases, the dialogue system 100 determines the task to be completed based on inputs submitted by the user during the conversation. For example, the system may be configured to perform multiple tasks and the dialogue system 100 can determine which task to perform based on one or more initial user inputs during the conversation.

During a given conversation with a user 102 of a user device 104, the dialogue system 100 receives a speech input 106 representing a conversational turn from the user device 104, e.g., over a data communication network, and, in response, generates a speech output 172 representing a system response to the conversational turn and provides the speech output 172 for playback on the user device 104, e.g., also over the data communication network.

To generate the speech output 172, a speech recognition engine 110 in the dialogue system 100 receives the speech input 106 and converts the speech input 106 into a text input 112 that is a transcription of the speech input (e.g., into the text "I'd like a large pineapple pizza"). In other words, the speech recognition converts the speech into a text representation of the conversational turn submitted by the user. The speech recognition engine 110 can convert the speech into text using any appropriate conventional automatic speech recognition (ASR) technique, e.g., a Hidden Markov Model (HMM) based recognition technique or a neural network based recognition technique.

Once the text input 112 has been generated, a natural language understanding (NLU) engine 120 converts the text input 112 into an annotation 122. Generally, the annotation 122 represents the text input 112 in a way that captures the semantics of the text input 112.

The annotation 122 can represent the semantics of the text input 112 in any of a variety of ways.

For example, the annotation 122 can be a frame that identifies (i) the intent of the text input 112 and (ii) values for one or more slots corresponding to the intent. Each slot corresponding to the intent is a slot whose value is required to be filled in order for the intent to be satisfied. For example, when the intent is to order a pizza from a restaurant menu, slots required to be filled include one or more slots for toppings for the pizza and a slot for the size of the pizza. As a specific example, for the conversational turn "I'd like a large pineapple pizza," the NLU engine 120 can generate an annotation 122 that selects a "request item" intent from a set of intents for the current task and assigns "large" as the value for the "size" slot and "pineapple" as the value for the "topping1" slot while indicating that the value for the "crust" slot is missing.

In some cases, the NLU engine 120 can also generate a confidence score that indicates how confident the NLU is that the conversational turn represented by the text input 122 has been properly annotated by the NLU. In the example of FIG. 1, the NLU engine 120 has assigned a confidence score of 0.9 to the annotation 122.

For example, the NLU engine 120 can be a recurrent neural network (RNN)-based model, e.g., a Long Short-Term Memory (LSTM)-based model, that receives as input the conversational turn and outputs an annotation that (i) identifies the intent of the conversational turn and (ii) an assignment of the various terms in the conversational turns to slots corresponding to the intent. As part of generating the annotation, the model also generates a confidence score for the annotation. An example of such an RNN-based model is described in Multi-Domain Joint Semantic Frame Parsing using Bi-directional RNN-LSTM, Dilek Hakkani-Tur, et al, available at https://pdfs.semanticscholar.org/d644/ ae996755c803e067899bdd5ea52498d7091d.pdf. Another example of such an RNN-based model is described in Effective Spoken Language Labeling with Deep Recurrent Neural Networks, Dinarelli, et al, available at https://arxiv.org/pdf/1706.06896.pdf. Yet another example of such an RNN-based model is described in SPOKEN LANGUAGE UNDERSTANDING USING LONG SHORT-TERM MEMORY NEURAL NETWORKS, Yao, et al, available at https://groups.csail.mit.edu/sls/publications/2014/ Zhang_SLT_2014.pdf.

The dialogue system 100 also includes a dialogue manager 130 that receives the annotation 122 and processes the annotation 122 to generate a semantic output 132. The semantic output 132 defines the semantics of a response to the user input. For example, the semantic output can include an output intent and values for one or more slots corresponding to the output intent. In the example of FIG. 1, the output 132 identifies the "prompt additional value" output intent from a set of output intents for the task and identifies "thin crust" as the value of the slot "value1" and "deep dish" as the value of the slot "value2."

The dialogue system 100 also includes a natural language generation engine 160 that receives the semantic output 132 and generates a text output 166 that conveys the semantics defined by the semantic output 132. For example, the natural language generation engine 160 can generate text that reflects the output intent and slot values included in the semantic output 132 (e.g., "Would you like thin crust or deep dish?").

Once the text output 166 has been generated, a text-to-speech engine 170 converts the text output 166 into the speech output 172, i.e., into speech that verbalizes the text output 166. The text-to-speech engine 170 can use any appropriate conventional text-to-speech technique to convert the text output 166 into the speech output 172, e.g., an HMM-based text-to-speech technique or a neural network-based text-to-speech technique.

As described, the NLU engine 120 generally includes one or more machine learning models, e.g., RNNs, and has been trained to generate accurate annotations by a training engine 180.

In particular, the training engine 180 trains the NLU engine 120 on training data 190 that includes multiple training examples. Each training example includes a training conversational turn and a corresponding annotation that has been classified as the correct annotation for the conversational turn.

The training engine 180 trains the NLU engine 120 on the training data 190 by adjusting the weights of the one or more machine learning models using an appropriate machine learning training technique in order to cause the NLU engine 120 to generate more accurate annotations for input conversational turns. For example, when the NLU is an RNN-based model, the training engine 180 can train the NLU using backpropagation through time or truncated backpropagation through time.

Once the training engine 180 has trained the NLU engine 120 to attain acceptable performance, the system 100 can begin interacting with users, i.e., having conversations with users to attempt to complete tasks.

During operation of the system, the training engine 180 can generate additional training data for the NLU engine 120 and periodically re-train the NLU engine 120 on the additional training data to fine-tune the weights of the NLU engine 120. This can further improve the accuracy of the NLU engine 120 and improve the overall performance of the system.

In particular, the training engine 180 can generate the additional training data by, during operation of the system, identifying conversational turns that have been submitted by users that are candidates for use in generating additional training data. Once a conversational turn has been identified, the training engine 180 can obtain paraphrases of the conversational turn and use the paraphrases as additional training conversational turns. In other words, the training engine 180 can generate a respective training example for each paraphrase and add the training examples to the additional training data that will be used to continue to train the NLU engine 120.

Generating additional training data will be described below with reference to FIGS. 2-4.

In the example of FIG. 1, the speech recognition engine 110, the natural language understanding engine 120, the dialogue manager 130, the natural language generation engine 160, and the text-to-speech engine 170 are all described as separate components of the dialogue system 100. In some other implementations, however, the functionality of two or more of these systems may be implemented as part of a single system. For example, a single engine may directly process a speech input to generate a semantic representation of the speech input.

Additionally, in the example of FIG. 1, the system input and output are both illustrated as being speech. However, in other examples, the modality of the system input, the modality of the system output, or both may be different. For example, both the input modality and the output modality may be text. As another example, the input modality may be text while the output modality is speech or vice versa.

Figure 2:
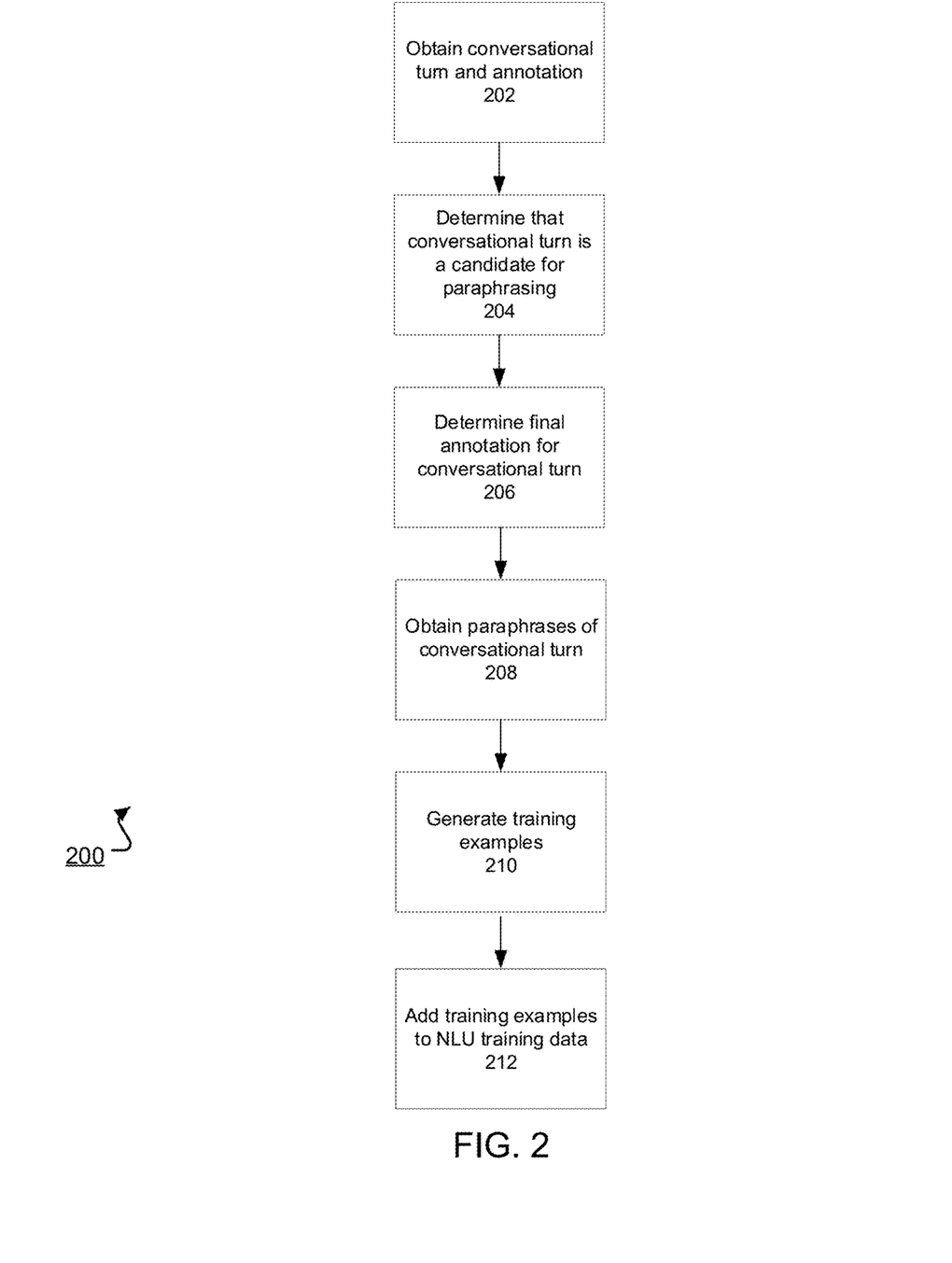
FIG. 2 is a flow diagram of an example process of generating additional training data for a natural language understanding (NLU) engine.

FIG. 2 is a flow diagram of an example process 200 for generating additional training data for the NLU engine. For convenience, the process 200 will be described as being performed by a system of one or more computers located in one or more locations. For example, a dialogue system, e.g., the dialogue system 100 of FIG. 1, appropriately programmed, can perform the process 200.

During operation of the system, the system obtains a conversational turn that was provided as input to the NLU engine and an annotation that was generated by the NLU engine for the conversational turn (step 202). In particular, the conversational turn was received or generated by the system, i.e., from user speech, during a conversation between a user and the system. If the NLU engine also generates confidence scores, the system also obtains the confidence score generated by the NLU engine for the annotation.

The system determines that the conversational turn is a candidate for paraphrasing to generate additional training data (step 204).

In some implementations, the system determines that the conversational turn is a candidate when the annotation did not accurately characterize the conversational turn. Determining that an annotation did not accurately characterize the conversational turn is described below with reference to FIG. 3.

In some implementations, the system determines that the conversational turn is a candidate when (i) the annotation accurately characterized the conversational turn but (ii) the NLU engine is likely to be inaccurate for conversational turns that are similar to the current conversational turn. Making this determination is described below with reference to FIG. 4.

In response to determining that the conversational turn is a candidate for paraphrasing, the system performs steps 206 through 212 of the process 200 to generate additional training data. That is, when the conversational turn is not a candidate, the system does not generate any additional training data using the conversational turn.

The system determines a final annotation for the conversational turn (step 206). If it was determined that the annotation accurately characterized the conversational turn, the system can use the annotation generated by the NLU engine as the final conversational turn. However, if it was determined that the annotation did not accurately characterize the conversational turn, the system determines a correct annotation for the conversational turn and uses the correct annotation as the final annotation for the conversational turn. Determining a correct annotation is described below with reference to FIG. 3.

The system obtains one or more paraphrases of the conversational turn (step 208).

A paraphrase of the current conversational turn is a different conversational turn, i.e., a conversational turn that uses different words from the current conversational turn, but that should be interpreted the same way as the current conversational turn by the system in the context of the current conversation. In other words, each paraphrase is a conversational turn that (i) has different words from the current conversational turn but (ii) should be annotated the same way by the NLU engine in the context of the current conversation.

In some implementations, the system generates the paraphrases using a paraphrasing neural network that is configured to receive as input a conversational turn and, optionally, data characterizing the context for the current conversation, and to output a paraphrase of the conversational turn. For example, the paraphrasing neural network can be a sequence-to-sequence neural network that includes an encoder configured to process the input to generate an encoded representation of the input and a decoder configured to process the encoded representations to generate the paraphrase.

In some other implementations, the system generates the paraphrases by submitting a request to a crowdsourcing platform, e.g., through an application programming interface (API) provided by the platform. The request can identify the conversational turn and the context of conversation as of the time that the conversational turn was submitted and request paraphrases that should be assigned the same meaning as the current conversational turn. In response, the system can obtain the paraphrases from the crowdsourcing platform. An example of such a crowdsourcing platform is the Amazon Mechanical Turk platform, hosted at https://www.mturk.com/.

The system generates a respective training example for each of the paraphrases (step 210). The training example for a given paraphrase identifies the final annotation for the conversational turn as the correct annotation for the paraphrase. That is, when the annotation generated by the NLU engine for the conversational turn was accurate, the training example identifies the annotation generated for the conversational turn by the NLU engine as the correct annotation for the paraphrase. When the annotation generated by the NLU engine for the conversational turn was not accurate, the training example identifies the correct annotation determined by the system for the conversational turn as the correct annotation for the paraphrase.

The system adds the training examples for the paraphrases to the NLU engine training data (step 212).

Once certain criteria have been satisfied, the system trains the NLU engine on the training examples that have been added to the training data to fine-tune the current weights of the NLU engine. For example, the system can train the NLU engine once a threshold number of training examples have been added to the training data since the last time the NLU engine was trained. As another example, the system can train the NLU engine once a threshold amount of time has elapsed since the last time the NLU engine was trained.

Thus, the system effectively generates additional training examples on which the NLU engine can be trained to improve the performance of the NLU engine by augmenting conversational turn—annotation pairs encountered during operation of the system with additional paraphrase—annotation pairs. The additional paraphrase—annotation pairs include accurate annotations even though they are generated with little to no human intervention and in a computationally-efficient manner. Additionally, as described below, additional paraphrase—annotation pairs are generated to target areas where the NLU engine performs poorly or is likely to perform poorly and therefore fewer additional training pairs are required to improve the performance of the NLU engine, i.e., because further training of the NLU engine in areas where it already performs well is avoided. This reduces the time and amount of computational resources required to improve the performance of the NLU engine.

Figure 3:
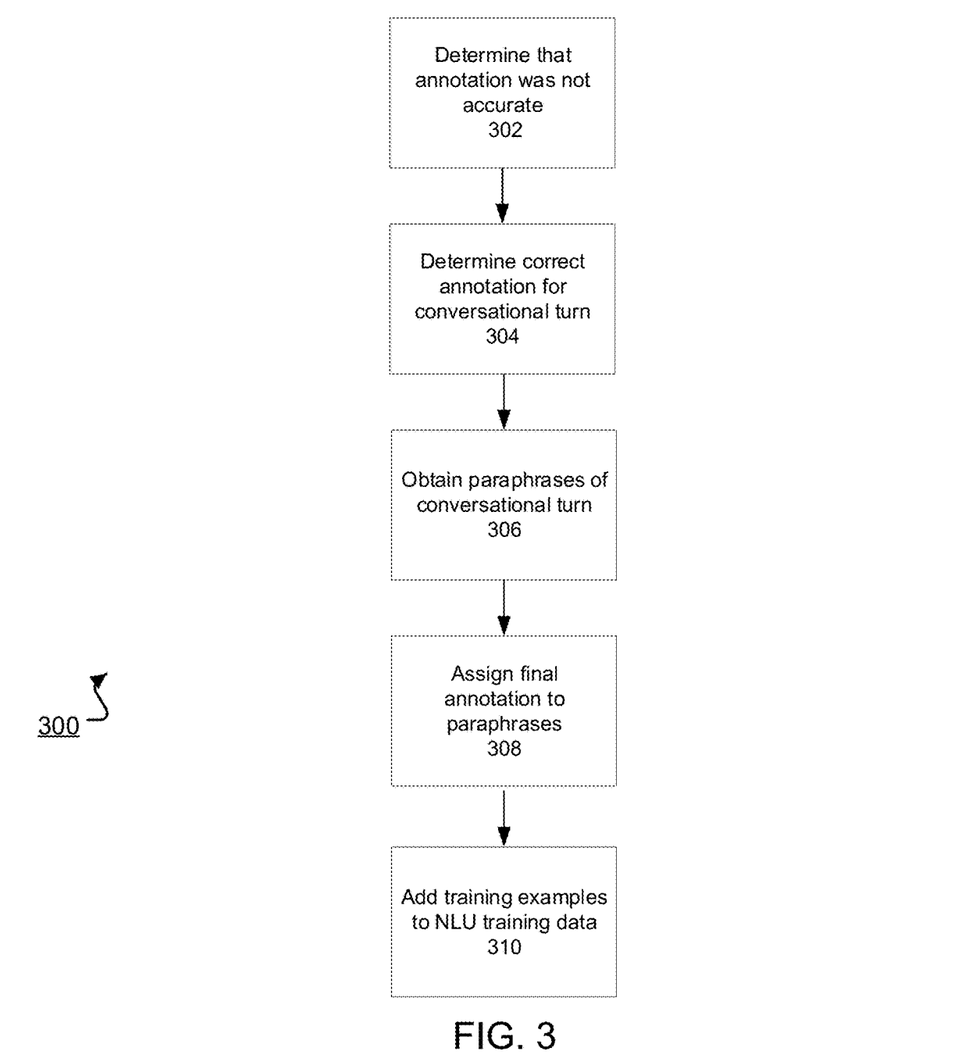
FIG. 3 is a flow diagram of an example process of generating additional training data from an inaccurate annotation.

FIG. 3 is a flow diagram of an example process 300 for generating additional training data from an inaccurate annotation. For convenience, the process 300 will be described as being performed by a system of one or more computers located in one or more locations. For example, a dialogue system, e.g., the dialogue system 100 of FIG. 1, appropriately programmed, can perform the process 300.

The system determines that the annotation did not accurately characterize the conversational turn (step 302).

The system can apply a set of one or more criteria when determining whether the annotation accurately characterized the conversational turn. That is, when one or more of the criteria in the set are satisfied, the system can determine that the annotation did not accurately characterize the conversational turn.

For example, the set of criteria can include a criterion that is based on the confidence score generated by the NLU engine for the annotation. In particular, this criterion can be satisfied when the score is below a threshold value.

As another example, the set of criteria can include one or more criteria that are based on the progress of the conversation after the annotation was generated, i.e., criteria that are dependent on whether the conversation after the annotation was generated indicates that the annotation for the current conversational turn is inaccurate.

An example of such a criterion is a criterion that is satisfied whenever a slot value assigned to a slot in the annotation of the current conversational turn is changed or removed by the user in a subsequent turn. Optionally, the criterion can also require that the conversational resulted in a task successfully being completed. For example, this criterion can be satisfied if, during a conversation to order a pizza, (i) the current turn is understood by the NLU as the user requesting a large pizza, (ii) the user ends up placing an order at the end of the conversation, and (iii) the placed order does not include a large pizza. In this example, the fact that "large pizza" was not included in the placed order is an indicator that the annotation for the current conversational turn was incorrect.

As another example, the set of criteria can include a criterion that is based on the output of a post-hoc annotation machine learning model that has been trained to determine whether a given annotation accurately characterizes a given conversational input. In particular, the post-hoc annotation machine learning model can be a recurrent neural network or a feedforward neural network that is configured to receive (i) the current conversational turn, (ii) the annotation assigned to the current conversational turn, and (iii) the remainder of the conversation, including conversational turns before the current conversational turn and conversational turns after the current conversational turn in the conversation. The output of the model can be an accuracy score that represents the likelihood that the input current conversational turn is accurately annotated by the input annotation. The system can train the post-hoc annotation machine learning model using an appropriate machine learning technique on training data that includes a set of inputs that each include (i), (ii), and (iii) above and, for each input in the set, a target output that indicates whether or not the annotation in the input accurately characterized the current conversational turn in the input.

In response to determining that the annotation did not accurately characterize the conversational turn, the system determines that the conversational turn is a candidate for paraphrasing and proceeds to perform steps 304 through 310 of the process 300.

The system determines a correct annotation for the conversational turn (step 304). That is, because it was determined that the annotation did not accurately characterize the conversational turn, the system determines a correct annotation for the conversational turn and uses the correct annotation as the final annotation for the conversational turn.

In particular, the system provides a request for a correct annotation to the crowdsourcing platform or to a user device of an expert user and obtains the correct annotation in response to the request. The request for the correct annotation includes the conversational turn and the context of the current conversation. For example, the context can be the conversational turns and system responses that have already been generated during the conversation or data summarizing the state of the conversation prior to the conversational turn being received.

The system obtains one or more paraphrases of the conversational turn as described above with reference to step 208 (step 306).

The system generates a respective training example for each of the paraphrases (step 308). The training example for a given paraphrase identifies the correct annotation determined by the system for the conversational turn as the correct annotation for the paraphrase.

The system adds the training examples for the paraphrases to the NLU engine training data (step 310).

Figure 4:
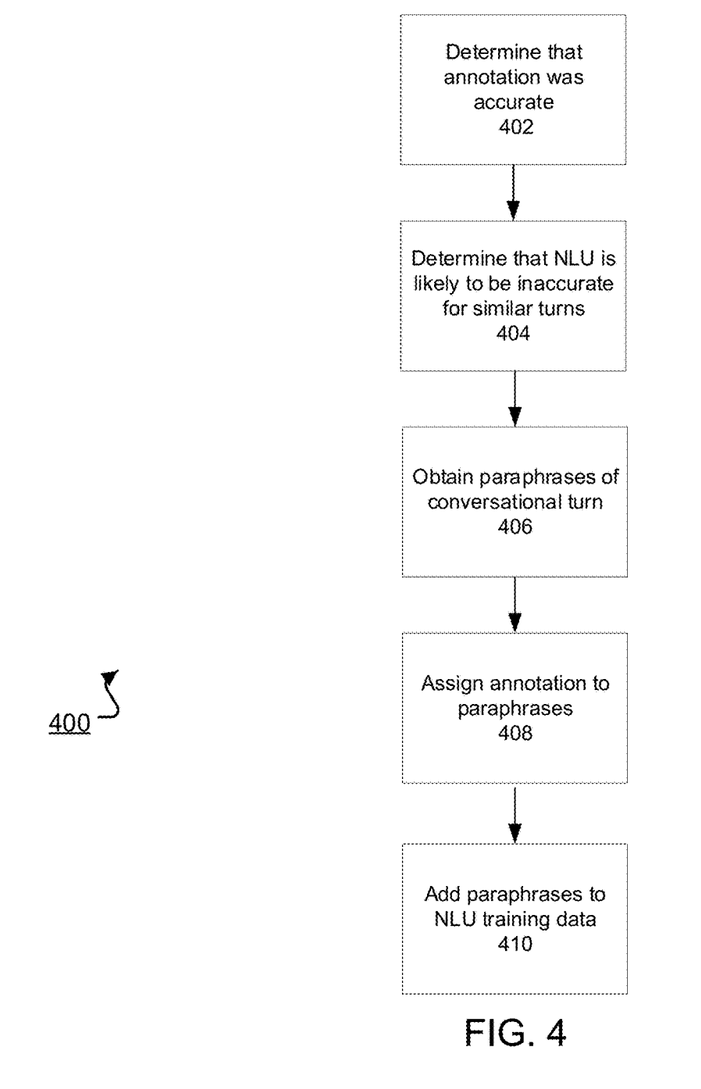
FIG. 4 is a flow diagram of an example process of generating additional training data from an accurate annotation.

FIG. 4 is a flow diagram of an example process 400 for generating additional training data from an accurate annotation. For convenience, the process 400 will be described as being performed by a system of one or more computers located in one or more locations. For example, a dialogue system, e.g., the dialogue system 100 of FIG. 1, appropriately programmed, can perform the process 400.

The system determines that the annotation accurately characterizes the conversational turn (step 402).

As described above, the system can apply a set of one or more criteria when determining whether the annotation accurately characterized the conversational turn. That is, when one or more of the criteria in the set are satisfied, the system can determine that the annotation accurately characterized the conversational turn.

For example, the set of criteria can include a criterion that is based on the confidence score generated by the NLU engine for the annotation. In particular, this criterion can be satisfied when the score is above a threshold value. This threshold value can be the same value or a different value from the one used when determining that a given annotation was not accurate.

As another example, the set of criteria can include one or more criteria that are based on the progress of the conversation after the annotation was generated, i.e., criteria that are dependent on whether the conversation after the annotation was generated indicates that the annotation for the current conversational turn is accurate.

An example of such a criterion is a criterion that is satisfied whenever (i) the conversation results in a task successfully being completed and (ii) none of the slot values assigned to slots in the annotation of the current conversational turn are changed or removed by the user in a subsequent turn. For example, this criterion can be satisfied if, during a conversation to order a pizza, (i) the current turn is understood by the NLU as the user requesting a pizza having pineapple as one of the toppings, (ii) the user ends up placing an order at the end of the conversation, and (iii) the placed order includes a pizza with toppings that include pineapple. In this example, the fact that pineapple was included as a topping the placed order (and none of the other slot values in the current annotation were later changed by the user) is an indicator that the annotation for the current conversational turn was correct.

As another example, the set of criteria can include a criterion that is based on the output of the post-hoc annotation machine learning model that has been trained to determine whether a given annotation accurately characterizes a given conversational input. In particular, this criterion can be satisfied when the accuracy score generated by the model exceeds a threshold value.

The system determines that the NLU engine is likely to be inaccurate for conversational turns that are similar to the current conversational turn (step 404).

To make this determination, the system identifies training conversational turns that the NLU engine has already been trained and that are similar to the current conversational turn according to a specified similarity measure.

For example, the similarity measure can be a distance in an embedding space. That is, the system can determine respective numeric embedding representations of the current conversational turn and the training conversational turns, with each numeric embedding representation being a vector in the embedding space. In this example, the system can determine that two conversational turns are similar when the numeric embedding representations for the two conversational turns are less than a threshold distance apart in the embedding space.

The numeric embedding representations can be generated using any appropriate technique that generates vectors that represent the meaning of input sentences, i.e., input conversational turns, such that two sentences that have similar or the same meaning will have embedding vectors that are close together in the embedding space. As an example, the embedding representations can be generated using n-gram features of the n-grams in the conversational turn. An example of such an embedding representation generation technique is described in Unsupervised Learning of Sentence Embeddings using Compositional n-Gram Features, Matteo Pagliardini, et al, available at https://arxiv.org/pdf/1703.02507.pdf. As another example, the embedding representations can be generated based on word vectors that capture the semantics of the words in the conversational turn. An example of such an embedding representation generation technique is described in Exploiting Sentence and Context Representations in Deep Neural Models for Spoken Language Understanding, Lina M. Rojas-Barahona, et al, available at http://mi.eng.cam.ac.uk/~sjy/papers/rgms16.pdf.

In some implementations, the system determines that the NLU engine is likely to be inaccurate for conversational turns that are similar to the current conversational turn when there are less than a threshold number of training conversational turns that are similar to the conversational turn according to the similarity measure. That is, the NLU engine is likely to be inaccurate when the NLU engine has not already been trained on very many conversational turns that are similar to the current conversational turn.

In some implementations, the system determines that the NLU engine is likely to be inaccurate for conversational turns that are similar to the current conversational turn when the NLU engine performs poorly on training conversational turns that are similar to the current conversational turn according to the similarity measure.

That is, the system can maintain data that identifies, for each training conversational turn, whether the annotation generated by the NLU engine for the conversational turn was inaccurate, i.e., according to the determination described above with reference to FIG. 3. The system can then determine that the NLU engine performs poorly on training conversational turns that are similar to the current conversational turn when the NLU engine has inaccurately annotated more than a threshold proportion of the similar training conversational turns.

In response to determining that (i) the annotation accurately characterized the current conversational turn but also (ii) the NLU engine is likely to be inaccurate for conversational turns that are similar to the current conversational turn, the system determines that the current turn is a candidate and performs steps 406 through 410 of the process 400.

The system obtains one or more paraphrases of the conversational turn as described above with reference to step 208 (step 406).

The system generates a respective training example for each of the paraphrases (step 408). Because the NLU engine accurately annotated the conversational turn, the training example for a given paraphrase identifies the annotation generated for the conversational turn by the NLU engine as the correct annotation for the paraphrase. Thus, although the training examples are likely to be helpful in improving the performance of the NLU engine, no additional human or computational resources are required to determine the correct annotation for the paraphrases even if a large number of paraphrases were obtained in step 406.

The system adds the training examples for the paraphrases to the NLU engine training data (step 410).

The above description describes that the annotations and outputs generated by the system are represented using intent-slot combinations. However, one of ordinary skill in the art would appreciate that many other representations of the semantics of a user input and a system output are possible. For example, the techniques described above could be used with the semantics of inputs and outputs represented as logical forms (first order logic, lambda calculus, and so on), graph-based representations, and other representation techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to perform operations comprising:

obtaining, during operation of a computer-implemented dialogue system comprising a natural language understanding engine, data identifying (i) a first input conversational turn that was provided as input to the natural language understanding engine during a dialogue between a user and the computer-implemented dialogue system and (ii) a first annotation of the first input conversational turn generated by the natural language understanding engine, wherein the natural language understanding engine has been trained on a first set of training data comprising a plurality of training conversational turns;

determining that the first annotation accurately characterized the first input conversational turn;

determining, based on the training conversational turns in the first set of training data, that the natural language understanding engine is likely to generate inaccurate annotations of other conversational turns that are similar to the first input conversational turn;

in response to determining that (i) the first annotation accurately characterized the first input conversational turn but (ii) the natural language understanding engine is likely to generate inaccurate annotations of other conversational turns that are similar to the first input conversational turn:

obtaining one or more first paraphrases of the first input conversational turn; and generating, for each of the one or more first paraphrases, a respective first training example that identifies the first annotation as the correct annotation for the first paraphrase; and training the natural language understanding engine on at least the first training examples.

2. The system of claim 1, wherein determining, based on the training conversational turns in the first set of training data, that the natural language understanding engine is likely to generate inaccurate annotations of other conversational turns that are similar to the first input conversational turn comprises:
identifying training conversational turns in the training data that are similar to the first input conversational turn according to a similarity measure.

3. The system of claim 2, wherein identifying training conversational turns in the training data that are similar to the first input conversational turn according to a similarity measure comprises:
determining a numeric embedding representation of the first input conversational turn;
determining respective numeric embedding representations of each of the training conversational turns; and
determining respective distances between the numeric embedding representation of the first input conversational turn and the numeric embedding representations of the training conversational turns.

4. The system of claim 2, wherein determining, based on the training conversational turns in the first set of training data, that the natural language understanding engine is likely to generate inaccurate annotations of other conversational turns that are similar to the first input conversational turn comprises:
determining that there are less than a threshold number of training conversational turns that are similar to the first input conversational turn according to the similarity measure.

5. The system of claim 2, wherein determining, based on the training conversational turns in the first set of training data, that the natural language understanding engine is likely to generate inaccurate annotations of other conversational turns that are similar to the first input conversational turn comprises:
determining that the natural language understanding unit performs poorly on training conversational turns that are similar to the first input conversational turn according to the similarity measure.

6. The system of claim 1, the operations further comprising obtaining a confidence score generated by the natural language understanding engine that represents a confidence that the first annotation is an accurate characterization of the first input conversational turn, and wherein determining that the first annotation accurately characterized the first input conversational turn comprises determining that the confidence score exceeds a threshold score.

7. The system of claim 1, wherein determining that the first annotation accurately characterized the first input conversational turn comprises:
processing the first input conversational turn and the first annotation using a post-hoc annotation machine learning model that is configured to generate as output a quality score that represents a likelihood that the first annotation is an accurate characterization of the first input conversational turn; and
determining that the quality score exceeds a threshold score.

8. The system of claim 7, wherein the post-hoc annotation machine learning model is configured to receive as input (i) the first input conversational turn, (ii) the first annotation, (iii) one or more conversational turns occurring before the first input conversational turn in the dialogue, and (iv) one or more conversational turns occurring after the first input conversational turn in the dialogue.

9. The system of claim 1, wherein determining that the first annotation accurately characterized the first input conversational turn comprises:
determining that conversational turns occurring after the first input conversational turn in the dialogue indicate that the first annotation accurately characterizes the first input conversational turn.

10. The system of claim 9, wherein determining that conversational turns occurring after the first input conversational turn in the dialogue indicate that the first annotation accurately characterize the first input conversational turn comprises:
determining (i) that a task was completed as a result of the dialogue and (ii) that no slot values assigned in the first annotation were changed or removed by the user in any of the conversational turns occurring after the first input conversational turn in the dialogue.

11. The system of claim 1, the operations further comprising:
obtaining, during operation of the computer-implemented dialogue system, data identifying (i) a second input conversational turn that was provided as input to the natural language understanding engine during the dialogue between the user and the computer-implemented dialogue system and (ii) a second annotation of the second input conversational turn generated by the natural language understanding engine;
determining that the second annotation did not accurately characterize the second input conversational turn;
in response to determining that the second annotation did not accurately characterize the second input conversational turn:
determining a correct annotation for the second conversational turn;
obtaining one or more second paraphrases of the second input conversational turn; and
generating, for each of the one or more second paraphrases, a respective second training example that identifies the correct annotation for the second conversational turn as the correct annotation for the second paraphrase; and
training the natural language understanding engine on at least the second training examples.

12. A method comprising:
obtaining, during operation of a computer-implemented dialogue system comprising a natural language understanding engine, data identifying (i) a first input conversational turn that was provided as input to the natural language understanding engine during a dialogue between a user and the computer-implemented dialogue system and (ii) a first annotation of the first input conversational turn generated by the natural language understanding engine, wherein the natural language understanding engine has been trained on a first set of training data comprising a plurality of training conversational turns;
determining that the first annotation accurately characterized the first input conversational turn;
determining, based on the training conversational turns in the first set of training data, that the natural language understanding engine is likely to generate inaccurate annotations of other conversational turns that are similar to the first input conversational turn;
in response to determining that (i) the first annotation accurately characterized the first input conversational turn but (ii) the natural language understanding engine is likely to generate inaccurate annotations of other conversational turns that are similar to the first input conversational turn:
  obtaining one or more first paraphrases of the first input conversational turn; and
  generating, for each of the one or more first paraphrases, a respective first training example that identifies the first annotation as the correct annotation for the first paraphrase; and
training the natural language understanding engine on at least the first training examples.

13. The method of claim 12, wherein determining, based on the training conversational turns in the first set of training data, that the natural language understanding engine is likely to generate inaccurate annotations of other conversational turns that are similar to the first input conversational turn comprises:
  identifying training conversational turns in the training data that are similar to the first input conversational turn according to a similarity measure.

14. The method of claim 13, wherein identifying training conversational turns in the training data that are similar to the first input conversational turn according to a similarity measure comprises:
  determining a numeric embedding representation of the first input conversational turn;
  determining respective numeric embedding representations of each of the training conversational turns; and
  determining respective distances between the numeric embedding representation of the first input conversational turn and the numeric embedding representations of the training conversational turns.

15. The method of claim 13, wherein determining, based on the training conversational turns in the first set of training data, that the natural language understanding engine is likely to generate inaccurate annotations of other conversational turns that are similar to the first input conversational turn comprises:
  determining that there are less than a threshold number of training conversational turns that are similar to the first input conversational turn according to the similarity measure.

16. The method of claim 13, wherein determining, based on the training conversational turns in the first set of training data, that the natural language understanding engine is likely to generate inaccurate annotations of other conversational turns that are similar to the first input conversational turn comprises:
  determining that the natural language understanding unit performs poorly on training conversational turns that are similar to the first input conversational turn according to the similarity measure.

17. The method of claim 12, further comprising obtaining a confidence score generated by the natural language understanding engine that represents a confidence that the first annotation is an accurate characterization of the first input conversational turn, and wherein determining that the first annotation accurately characterized the first input conversational turn comprises determining that the confidence score exceeds a threshold score.

18. The method of claim 12, wherein determining that the first annotation accurately characterized the first input conversational turn comprises:
  processing the first input conversational turn and the first annotation using a post-hoc annotation machine learning model that is configured to generate as output a quality score that represents a likelihood that the first annotation is an accurate characterization of the first input conversational turn; and
  determining that the quality score exceeds a threshold score.

19. The method of claim 18, wherein the post-hoc annotation machine learning model is configured to receive as input (i) the first input conversational turn, (ii) the first annotation, (iii) one or more conversational turns occurring before the first input conversational turn in the dialogue, and (iv) one or more conversational turns occurring after the first input conversational turn in the dialogue.

20. The method of claim 12, wherein determining that the first annotation accurately characterized the first input conversational turn comprises:
  determining that conversational turns occurring after the first input conversational turn in the dialogue indicate that the first annotation accurately characterizes the first input conversational turn.

21. The method of claim 20, wherein determining that conversational turns occurring after the first input conversational turn in the dialogue indicate that the first annotation accurately characterize the first input conversational turn comprises:
  determining (i) that a task was completed as a result of the dialogue and (ii) that no slot values assigned in the first annotation were changed or removed by the user in any of the conversational turns occurring after the first input conversational turn in the dialogue.

22. The method of claim 12, further comprising:
  obtaining, during operation of the computer-implemented dialogue system, data identifying (i) a second input conversational turn that was provided as input to the natural language understanding engine during the dialogue between the user and the computer-implemented dialogue system and (ii) a second annotation of the second input conversational turn generated by the natural language understanding engine;
  determining that the second annotation did not accurately characterize the second input conversational turn;
  in response to determining that the second annotation did not accurately characterize the second input conversational turn:
    determining a correct annotation for the second conversational turn;
    obtaining one or more second paraphrases of the second input conversational turn; and
    generating, for each of the one or more second paraphrases, a respective second training example that identifies the correct annotation for the second conversational turn as the correct annotation for the second paraphrase; and
  training the natural language understanding engine on at least the second training examples.

23. One or more non-transitory computer-readable storage media storing instructions that when executed by one or more computers cause the one or more computers to perform operations comprising:
  obtaining, during operation of a computer-implemented dialogue system comprising a natural language understanding engine, data identifying (i) a first input conversational turn that was provided as input to the natural language understanding engine during a dialogue between a user and the computer-implemented dialogue system and (ii) a first annotation of the first input conversational turn generated by the natural language understanding engine, wherein the natural language understanding engine has been trained on a first set of training data comprising a plurality of training conversational turns;

determining that the first annotation accurately characterized the first input conversational turn;

determining, based on the training conversational turns in the first set of training data, that the natural language understanding engine is likely to generate inaccurate annotations of other conversational turns that are similar to the first input conversational turn;

in response to determining that (i) the first annotation accurately characterized the first input conversational turn but (ii) the natural language understanding engine is likely to generate inaccurate annotations of other conversational turns that are similar to the first input conversational turn:

obtaining one or more first paraphrases of the first input conversational turn; and generating, for each of the one or more first paraphrases, a respective first training example that identifies the first annotation as the correct annotation for the first paraphrase; and training the natural language understanding engine on at least the first training examples.

24. The computer-readable storage media of claim 23, wherein determining, based on the training conversational turns in the first set of training data, that the natural language understanding engine is likely to generate inaccurate annotations of other conversational turns that are similar to the first input conversational turn comprises:

identifying training conversational turns in the training data that are similar to the first input conversational turn according to a similarity measure.

25. The computer-readable storage media of claim 24, wherein determining, based on the training conversational turns in the first set of training data, that the natural language understanding engine is likely to generate inaccurate annotations of other conversational turns that are similar to the first input conversational turn comprises:

determining that there are less than a threshold number of training conversational turns that are similar to the first input conversational turn according to the similarity measure.

26. The computer-readable storage media of claim 24, wherein determining, based on the training conversational turns in the first set of training data, that the natural language understanding engine is likely to generate inaccurate annotations of other conversational turns that are similar to the first input conversational turn comprises:

determining that the natural language understanding unit performs poorly on training conversational turns that are similar to the first input conversational turn according to the similarity measure.

27. The computer-readable storage media of claim 23, wherein determining that the first annotation accurately characterized the first input conversational turn comprises:

processing the first input conversational turn and the first annotation using a post-hoc annotation machine learning model that is configured to generate as output a quality score that represents a likelihood that the first annotation is an accurate characterization of the first input conversational turn; and determining that the quality score exceeds a threshold score.

28. The computer-readable storage media of claim 23, wherein determining that the first annotation accurately characterized the first input conversational turn comprises:

determining that conversational turns occurring after the first input conversational turn in the dialogue indicate that the first annotation accurately characterizes the first input conversational turn.

29. The computer-readable storage media of claim 28, wherein determining that conversational turns occurring after the first input conversational turn in the dialogue indicate that the first annotation accurately characterizes the first input conversational turn comprises:

determining (i) that a task was completed as a result of the dialogue and (ii) that no slot values assigned in the first annotation were changed or removed by the user in any of the conversational turns occurring after the first input conversational turn in the dialogue.

30. The computer-readable storage media of claim 23, the operations further comprising:

obtaining, during operation of the computer-implemented dialogue system, data identifying (i) a second input conversational turn that was provided as input to the natural language understanding engine during the dialogue between the user and the computer-implemented dialogue system and (ii) a second annotation of the second input conversational turn generated by the natural language understanding engine;

determining that the second annotation did not accurately characterize the second input conversational turn;

in response to determining that the second annotation did not accurately characterize the second input conversational turn:

determining a correct annotation for the second conversational turn;

obtaining one or more second paraphrases of the second input conversational turn; and generating, for each of the one or more second paraphrases, a respective second training example that identifies the correct annotation for the second conversational turn as the correct annotation for the second paraphrase; and training the natural language understanding engine on at least the second training examples.

* * * * *